(12) United States Patent
Murphy et al.

(10) Patent No.: US 9,657,213 B2
(45) Date of Patent: May 23, 2017

(54) CURABLE, RESEALABLE, SWELLABLE, REACTIVE SEALANT COMPOSITION FOR ZONAL ISOLATION AND WELL INTEGRITY

(71) Applicant: Kraton Polymers U.S. LLC, Houston, TX (US)

(72) Inventors: Erin B. Murphy, Katy, TX (US); Duc V. Nguyen, Houston, TX (US); Robert C. Bening, Katy, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/517,968

(22) Filed: Oct. 20, 2014

(65) Prior Publication Data
US 2016/0108305 A1   Apr. 21, 2016

(51) Int. Cl.
| | |
|---|---|
| *C09K 8/44* | (2006.01) |
| *C09K 8/508* | (2006.01) |
| *C09K 8/035* | (2006.01) |
| *C08F 220/18* | (2006.01) |
| *C08F 220/56* | (2006.01) |
| *C08F 222/10* | (2006.01) |
| *C09J 4/00* | (2006.01) |

(52) U.S. Cl.
CPC .............. *C09K 8/44* (2013.01); *C08F 220/18* (2013.01); *C08F 220/56* (2013.01); *C08F 222/10* (2013.01); *C09J 4/00* (2013.01); *C09K 8/035* (2013.01); *C09K 8/5083* (2013.01); *C08F 2222/1026* (2013.01)

(58) Field of Classification Search
CPC ...... C09K 8/52; C09K 2208/12; C09K 8/594; C09K 8/80; C09K 8/805; C09K 2205/122; C09K 2205/126; C09K 2205/13; C09K 2205/22; C09K 2205/32; C09K 2208/08; C09K 3/00; C09K 3/30; C09K 5/045; C09K 8/28; C09K 8/424; C09K 8/426; C09K 8/46; C09K 8/58; C09K 8/584; C09K 8/592; C09K 8/70; C09K 8/74; C09K 8/845; C09K 8/86; C09K 8/905; C09K 8/08; C09K 19/3068; C09K 19/38; C09K 19/42; C09K 19/54; C09K 19/542; C09K 19/586; C09K 2019/0448; C09K 2019/2035; C09K 2019/2078; C09K 2019/3083; C09K 3/16; C09K 8/44
See application file for complete search history.

(56) References Cited

U.S. PATENT DOCUMENTS

| | | | |
|---|---|---|---|
| 5,382,290 A | 1/1995 | Nahm et al. | |
| 5,464,060 A | 11/1995 | Hale et al. | |
| 5,886,125 A | 3/1999 | Huybrechts | |
| 6,328,106 B1 * | 12/2001 | Griffith | C09K 8/512 166/295 |
| 7,343,974 B2 | 3/2008 | Cowan | |
| 7,348,376 B2 | 3/2008 | Gelles | |
| 7,530,396 B1 | 5/2009 | Reddy et al. | |
| 7,696,133 B2 | 4/2010 | Cowan | |
| 9,238,770 B2 | 1/2016 | Murphy | |
| 2004/0024079 A1 | 2/2004 | Erickson, Jr. et al. | |
| 2006/0205849 A1 * | 9/2006 | St. Clair | C08F 297/04 524/286 |
| 2006/0205904 A1 | 9/2006 | St. Clair | |
| 2006/0240257 A1 * | 10/2006 | Schwantes | B01J 13/02 428/402.2 |
| 2006/0276348 A1 * | 12/2006 | Cowan | C09K 8/5083 507/224 |
| 2009/0062420 A1 | 3/2009 | Dubois | |
| 2010/0240819 A1 * | 9/2010 | Perello | C08L 31/02 524/524 |
| 2012/0129994 A1 * | 5/2012 | Birkett | C08F 290/067 524/239 |
| 2012/0142848 A1 | 6/2012 | Bzowej et al. | |
| 2013/0261220 A1 * | 10/2013 | Murphy | C09K 8/44 |

FOREIGN PATENT DOCUMENTS

WO   20090137197A2            11/2009

OTHER PUBLICATIONS http://pubs.usgs.gov/info/clays/ page 2 downloaded on Dec. 2, 2015.*

(Continued)

*Primary Examiner* — Kumar R Bhushan
(74) *Attorney, Agent, or Firm* — Ekatherina Serysheva (57) ABSTRACT

The invention relates to a curable sealant composition broadly comprising a resealable, swellable, reactive sealant and free radical initiator; said resealable, swellable reactive sealant comprises monofunctional monomer(s), multifunctional monomer(s), reactive polymer such as unsaturated styrenic block copolymer, swellable additive, and optional components. The monofunctional monomer is a vinyl ester derivative of versatic acid with $C_9$-$C_{12}$ carbon atoms, or monoacrylate, monomethacrylate, monoacrylamide, or monomethacrylamide. The multifunctional monomer are di-, tri-, tetra-, and/or penta-functional monomers with vinyl, acrylate, methacrylate, acrylamide, or methacrylamide functionality, such as tricyclodecane dimethanol diacrylate, trimethylolpropane trimethacrylate, 1,3-butylene glycol dimethacrylate or a mixture thereof. The reactive unsaturated polymer is a styrenic block copolymer such as SBS, SIS, S-I/B-S, I-SEBS-I, and mixtures of two or more of these. The swellable additive is selected from saturated block copolymers such as SEBS, SEPS, SEEPS, and I-SEBS-I, or a mixture of these. Free radical initiators are preferably peroxides, although others are acceptable.

11 Claims, 5 Drawing Sheets

(56) References Cited

OTHER PUBLICATIONS http://pubs.usgs.gov/info/clays/page 2 downloaded on Dec. 2, 2015.*
Written opinion of the International searching authority Dec. 2, 2015.*
International Search Report for PCT/US2015/056160, dated Jan. 5, 2016.
Taiwan Search Report for Taiwan Pat. Appln. No. 104134110, dated Oct. 3, 2016.

* cited by examiner

CURABLE, RESEALABLE, SWELLABLE, REACTIVE SEALANT COMPOSITION FOR ZONAL ISOLATION AND WELL INTEGRITY

FIELD OF THE INVENTION

The curable, resealable, swellable, reactive sealant composition is suitable as a downhole sealant for zonal isolation and well integrity in oil wells. The composition has a similar rheological profile to a typical oil-based drilling fluid and can be controllably set into a solid with a good balance of properties, including strength, elasticity, and the ability to form a competent seal. The composition of the curable, resealable, swellable, reactive sealant comprises: 1) monofunctional monomers such as vinyl ester, acrylate, methacrylate, acrylamide, and/or methacrylamide; 2) multifunctional monomers such as a di-, tri-, tetra- or penta-functional monomers with vinyl, acrylate, methacrylate, acrylamide, and/or methacrylamide functionality; 3) reactive unsaturated polymer such as unsaturated styrenic block copolymers; 4) swellable additive that swells when in the presence of oil and/or water; 5) free radical initiator, and 6) optional ingredients such as inhibitor, suspending agent and/or fluid loss additive. Although the composition may be combined with a weighting agent, the amount and type varies for each and every well, and therefore it is not part of the curable, resealable, swellable reactive sealant composition.

BACKGROUND OF THE INVENTION

The general procedure of drilling an oil or gas well includes drilling a borehole using a drilling fluid. Subsequent to drilling the borehole, casing is run into the well, preparatory to placing cement slurry in the annulus between the outside of the casing and the borehole wall. In order to obtain a good cementing job, it is necessary to displace substantially all of the drilling fluid or mud in the annulus with cement. This necessity arises from the fact that undisplaced mud and filter cake become the source of unsuccessful cement jobs since drilling fluids and cements are usually incompatible. Thus, most oil-based muds will either cause instant setting of the cement or act as a retarder of the cement that can adversely affect the strength. On the other hand, most cement slurries will flocculate and thicken most oil-based muds. As the cement is pumped out of the bottom of the casing and up the annulus, it may form flow channels through blocking sections of flocculated drilling mud. In addition, undisplaced filter cake can prevent cement from bonding to the formation and may become the source of flow channels. Additionally, the cement may shrink upon curing which also may contribute to flow channels.

U.S. Pat. No. 5,382,290 to Shell Oil Co. teaches that a water-in-oil emulsion drilling fluid can be converted into oil mud-cement slurry for use in oil well cementing procedures. Also, a universal fluid can be prepared using the water-in-oil emulsion drilling fluid by treating with a hydraulic material so that it will lay down a filter cake during drilling, which can be triggered to set into a hard cement and bond to the formation after the above oil mud-cement slurry has been placed in the borehole at the conclusion of drilling. Good zonal isolation can be achieved if the filter cake hardens, permanently bonds to the formation face and provides hydraulic sealing.

U.S. Pat. No. 5,464,060 assigned to Shell Oil Co. discloses a composition for use in drilling and cementing a well, thus avoiding removal of the drilling fluid, since the composition can be employed for both functions. The "universal drilling fluid" comprises the product of a drilling mud admixed with a hydraulic material which is suitable for drilling a borehole and laying down a settable filter cake on the walls of said borehole; and an activator mixable with or contacting the filter cake, the activator being functional to cause the filter cake to harden and set up. A preferred way of applying the activator is to conduct a normal cement job with a cement or mud-concrete slurry which carries the activator. The activator may also be admixed with a mud, a spotting fluid, or a pill, and the resulting fluid may be spotted or circulated through the annulus prior to cementing. The activator is subsequently filtered (diffused) through the filter cake and causes it to set hard.

The advantages realized by the Shell invention include the following: (1) a universal fluid is functionally and rheologically suitable as a drilling fluid; (2) the settable filter cake laid down by the universal fluid hardens to a relatively high compressive strength, for example, about 3,500 psi; (3) improved zonal isolation is achieved by the settable filter cake which bonds to the formation and the cementing medium; (4) the bond between the hardened filter cake and the cementing medium is very strong; and (5) it is not necessary either to displace mud or to remove the mud filter cake when a universal fluid is used as a drilling fluid in a well.

Achieving good solution viscosity is important for any fluid pumped down a wellbore; the fluid must have sufficiently high viscosity at low shear rates to suspend solids, yet have low enough viscosity at high shear rates to prevent excessive pump pressures. Managing the rheology of the fluid is critical for well control and to increase drilling rates. Additionally, important time constraints are desired, where it may take 4 to 6 hours to pump a drilling fluid into a very deep well bore, but then the drilling fluid must gel and thicken quickly. Contrarily, waiting 24 or more hours for Portland cement to gel is expensive and runs the risk that within the set time conditions may change in the well that presents additional obstacles to sealing a well.

U.S. Pat. Nos. 7,343,974 and 7,696,133 to Shell Oil co. disclose a composition for strengthening a bore hole, comprising vinyl ester of a $C_9$ to $C_{11}$ versatic acid, at least one di- or tri-functional acrylate or methacrylate monomer, peroxide initiator, and unsaturated styrenic block copolymer, namely Kraton® D triblock copolymers. Weighting agents like barite (barium sulfate) are incorporated in the composition.

U.S. Pat. No. 7,530,396 to Halliburton Energy Services, Inc. discloses a self-repairing cement composition comprising a cementious material such as Portland cement, an elastic material comprising a polar group that bonds to the cementious material, and water. The elastic material may be butadiene, acrylonitrile copolymers, ethylene and acrylic comonomers. Attached to the elastic material is a polar group such as a carboxylate group having the formula —COOR. Once the cement composition sets, if the surrounding structure cracks or fails, various fluids may seep into the cracks and result in zonal communication. As temperature in the well increases, as a result of fluids flowing from deep strata, the elastic material within the cement composition softens and may even phase change to a liquid and self-repair the crack.

Accessing low margin, highly fractured, and other challenging reservoirs has become increasingly difficult using traditional cement materials. A reactive sealant that has a low solution viscosity, good compressive strength and mechanical properties, such as ductility, and which can be controllably set in a desired zone would allow greater access to such challenging wells. Despite the advantages of such a reactive sealant, there also exists a need in the oilfield for materials that are capable of sealing any post-cure fractures or cracks, for instance through swelling in the presence of a suitable fluid. Additionally, it is well known that hydraulic cements do not perform well in the presence of oil-based mud. A resealable, reactive material that possesses improved retention of mechanical properties in the presence of at least 20 wt. % oil based mud contamination (i.e., at least about 400 psi compressive strength) would therefore be highly desirable, as it may eliminate the need for both hole clean-out and the use of spacer fluids.

SUMMARY OF THE INVENTION

All ranges set forth in the specification and claims include not only the end point of the ranges, but also every conceivable number between the end point of the ranges, since that is the very definition of a range.

The present invention is a composition that has a similar rheological profile to a typical oil-based or synthetic-based drilling fluid which can be controllably set at a range of desired bottom hole static temperatures (BHST) to create a composite that has good elasticity, toughness, and strength; in addition, this material possesses better performance in the presence of oil-based mud than does traditional hydraulic cement. Lastly, the material is capable of swelling in the presence of hydrocarbon and/or water; this allows for both the recovery of volumetric shrinkage that may result from the curing process, as well as resealability upon formation of cracks and the resulting influx of hydrocarbon, non-aqueous fluid, and/or water. The curable sealant composition of the present invention comprises a resealable, swellable, reactive sealant composition comprising monofunctional monomer(s), multifunctional monomer(s), reactive unsaturated polymer(s), swellable additive(s), free radical initiator(s), and possibly other optional ingredients. By "monofunctional monomer" is meant a monomer that is susceptible to only one free radical reaction. By "multifunctional monomer" is meant a monomer that is susceptible to more than one free radical reaction. Both the monofunctional monomer and the multifunctional monomer may have other reactive groups that are not free radical reactive. An important characteristic of the curable sealant is the elastic modulus, which not only influences overall toughness of the material but should also be sufficiently low to allow the reactive sealant to be flexible enough for swelling to occur; if it possess too high of a modulus the sealant is too rigid to swell in the presence of hydrocarbon, other non-aqueous fluid, and/or water, or combinations of these. Flexibility is important, but so is the ability of the curable sealant to bond well to its surrounding environment to form a competent seal; in particular, the curable sealant is suitable as a downhole sealant for zonal isolation. The curable composition of this invention includes: 1) monofunctional monomer(s), such as vinyl ester, acrylate, methacrylate, acrylamide, methacrylamide monomers, or a mixture of two or more of these; 2) multi-functional monomer(s), such as di, tri-, tetra-, and penta-functional monomers with vinyl, acrylate, methacrylate, acrylamide, or methacrylamide functionality, or a mixture of two or more of these; 3) reactive polymer that has unsaturation, and is capable of free radical reaction, such as styrene-butadiene-styrene (SBS), styrene-isoprene-styrene (SIS), S-I/B-S or i-SEBS-i where i is a small amount of isoprene and EB is partially hydrogenated butadiene (also known as ethylene-butylene), or a mixture of two or more of these; 4) swellable additive that swells in the presents of water, oil, other non-aqueous fluids, or combinations of these; 5) one or more free radical initiator, and 6) optional additives such as inhibitor, clay, fluid loss additive, a sag reduction agent, and/or other additives known in the art, or combinations thereof. The first 4 components add up to 100 wt. percent. The free radical initiator and the optional other components are specified in terms of 100 parts by total weight of the first four components.

Key performance requirements include the viscosity of the material in the solution state, the ability to cure this material in a controllable manner with a quick transition from liquid to solid (right angle set), the elasticity and toughness of the cured composite, the swellability, and the ability to maintain those performance requirements in the presence of oil-based fluids. It is desirable that the reactive sealant have a low solution viscosity such that it remains a liquid under wide temperature and pressure ranges. A suitable temperature range is 0 to 180° C. Further, it must be a liquid that is pumpable under normal well head conditions, including deep well conditions under the ocean. The pump pressure necessary to pump a liquid one mile under the ocean is about 2500 to 3000 pounds per square inch, depending on the amount of weighting agent. For the present invention, note that the Thickening Time tests (time for the composition to reach 70 BC—see table 5) are conducted at 10,000 psi. This pressure is more than enough for the composition of the present invention to be viable at one mile under the ocean. In fact, the present invention can withstand even more than 10,000 psi.

For the present invention, it is believed that a solution viscosity of about 25 to about 5,000 centipoise (cP) at the end of the well bore or at pumping is satisfactory. The curable reactive sealant can be crafted to set within a certain time frame, for example within 25 minutes to as long as 10 hours, so that it is pumpable for as long as need be, and then cured to seal the well in the manner desired. For swellability, it is desired that the additive or additives be able to swell by increasing its weight as it absorbs water, oil, other non-aqueous fluids, or combinations of these, to at least 15 wt. %, and preferably to at least 50 wt. %, more preferably to at least 75 wt. %, and most preferably to at least 100 wt. % (at 100 wt. % it is twice its original weight), where the composition is not weighted—i.e. does not contain a weighting agent.

In particular, the monofunctional monomer is present in an amount ranging from 50 to 90 wt. % of the resealable, swellable, reactive sealant composition, more preferably 50 to 75 wt. %, and most preferably 55 to 70 wt. %. The multifunctional monomer is present in a range of 5 to 50 wt. % of the resealable, swellable, reactive sealant, more preferably 10 to 30 wt. %. The reactive unsaturated polymer is in the range of 1 to 15 wt. % of the resealable, swellable, reactive sealant, preferably 3 to 10 wt. %. The swellable additive is in a range of 1 to 15 wt. % of the resealable, swellable, reactive sealant, preferably 3 to 10 wt. %. The first four components of the resealable, swellable, reactive sealant totals 100 weight percent. Lastly, the free radical initiator is added to 100 parts by total weight of the monofunctional monomer, the multifunctional monomer, the reactive polymer and the swellable additive, in an amount of 0.05 to 5 parts by weight, preferably 0.3 to 3 parts by weight, and more preferably 0.5 to 2 parts by weight. Optional other components may be present in an amount ranging from 0 to 10 parts by weight based on the total weight of the first four components of the resealable, swellable, reactive sealant composition. The amount of weighting agent is whatever is necessary for the composition to be in a range of about 8 to about 18 pounds per gallon, as required. The amount depends on factors which are different for every well. Although it may be needed for every well, the weighting agent is never part of the reactive sealant composition, but it is mixed with the resealable swellable reactive sealant composition.

For the ranges set forth above, each range includes the beginning and ending number and each number in between, and the range of each component may be limited such that it includes any range within the limits of the beginning and ending number. This wide range for each component is necessary because well conditions vary in depth, temperature, pressure, geological strata, and it is possible that one well may encounter water, natural gas and oil-bearing strata, or any combination thereof. To formulate a curable sealant for each well requires custom assembling of the components to obtain the required features.

The resealable, swellable, reactive sealant composition has the following features: a solution viscosity of about 25 to about 5,000 centipoise (cP) at the end of the well bore or at pumping, and preferable 30 to 1000 cP; a minimum compressive strength of 400 psi when cured (in the absence of oil-based or synthetic-based mud); a cure time of 25 to 600 minutes, preferably 180 to 360 minutes; swellability of up to 110% (more than twice its original weight); and retention of mechanical properties such as ductility and flexibility in the presence of up to about 20 wt. % oil-based mud, preferably up to 30 wt. % oil-based mud, more preferably up to 40 wt. % oil-based mud and most preferably up to 50 wt. % oil-based mud.

BRIEF DESCRIPTION OF THE DRAWING

The drawings are provided as an aid in understanding the invention. However the drawings are not meant to limit the invention in a manner inconsistent with the scope of the claims.

DESCRIPTION OF THE PREFERRED EMBODIMENTS

The present invention relates to curable, resealable, swellable reactive sealant composition with free radical initiator having a good balance of properties, including solution viscosity, elasticity, strength, toughness, compatibility with oil-based muds, stability under a wide temperature range, and adhesion to steel. While the main performance requirement of Portland cement is compressive strength, other mechanical properties, such as elastic modulus and toughness, may be better indicators for improved sealant performance and extended functional lifetimes. While the compressive strength may be similar to Portland cement under equivalent conditions, the toughness of the reactive sealant may be much higher than Portland cement. Toughness is defined as the amount of energy per unit volume that a material can absorb before failure occurs; it can be quantified by calculating the area under the stress-strain curve at failure. However, as only compressive strength is usually measured for cement, these are the values typically required to determine performance in a downhole sealant. Compressive strengths of greater than or equal to about 400 psi are considered necessary. In addition, the curable sealant composition may contain up to 50 wt. % oil-based mud.

Solution viscosity is an important feature because it measures the pumpability of the fluid. A fluid that possesses a high viscosity is difficult to pump, especially a mile below the surface. Also, high viscosity fluid can be detrimental to weak subterranean formations due to high pressure that may cause a blowout in the wellbore. For deep wells, a solution viscosity between about 25 to about 5,000 cP enables the fluid to be pumped at a reasonable cost. Viscosity in centipoise is measured according to API RP10B-2, "Recommended Practice for Testing Well Cements", Section 12, "Determination of Rheological Properties and Gel Strength".

Swellability is an essential feature of the present invention; it serves a dual purpose of allowing for recovery of any volumetric shrinkage resulting from the curing process as well as allowing for sealing any cracks that may form in the sample post-cure. After the curable sealant has set or cured, it is important that the resealable, swellable, reactive sealant composition (only components i-iv as stated above) can swell at least up to the amount of 10% greater than the resealable, swellable, reactive sealant composition original weight to seal fissures, cracks and fractures when it contacts oil, other non-aqueous fluids and/or water, including salt water.

By "swellable" it means after the composition of the invention initially cures, if the composition then proceeds to crack or fracture, and oil, other non-aqueous fluids, and/or water seeps into the crack or fissure, a component of the composition will swell in the presence of oil, other non-aqueous fluids, and/or water and swell at least 15% by weight, preferably 30%, more preferably 60%, and most preferably over 100%, up to 200% by weight of the reactive sealant composition.

By "resealable" it means after the composition of the present invention initially cures, then if the composition cracks or fractures, and oil, other non-aqueous fluids, and/or water seeps into the crack or fissure, the composition will re-seal itself due to the swellable component expanding sufficiently that it seals again.

Compatibility with oil-based muds (OBM) or synthetic-based muds (SBM) is important because during curing of the sealant, it is often the case that the curable sealant composition becomes mixed with drilling mud. Drilling mud carries the bits of earth, dirt and stone to the top of the casing. When the well depth has been met, the casing pipe is then introduced and cemented into position. It may be important that the curable sealant composition tolerate up to about 20 to 50 wt. % OBM/SBM and still achieve sufficient compression strength and toughness when set. This permits cementing of the wellbore without having to first cleanout the drilling mud and subsequently treating the casing and rock surface with adhesion promoters, potentially eliminating the need for a spacer fluid. Specifically, the curable sealant must still have good adhesion to the steel casing so that the casing is locked in place within the well bore. The adhesion must be sufficient to seal any fluid (liquid and/or gas), such as oil or water strata, from traveling up the pipe's outer surface.

It is well known that the deeper a well, the hotter the temperature at the end of the casing. Heat limits the ability of Portland cement to set properly and when it does cure hot, the compressive strength is weaker. Organic peroxides are one type of free radical initiator that cause the reactive sealant to set, becoming more reactive as the temperature rises. It is important that the set not occur until the reactive sealant reaches the desired depth. The right angle cure time is a measure of time when the fluid viscosity has achieved a certain minimum value ~70 Bearden Consistency units (BC). Thus, the time when the fluid reaches 70 BC is an important parameter as this indicates that the fluid is no longer pumpable, similar to a gel point. This time can be as little as 25 minutes or as long as 600 minutes, or longer. It may be necessary to incorporate a curing retardant to slow down the curing time when the temperature is high and the well is deep. Commercially available scorch protected free radical inhibitors or scavengers can be employed to reduce the effects of heat on the initiator by lowering the active oxygen content. Although longer thickening (cure) times can be created, most wells are easily within the time range of 50 to 600 minutes.

The curable, resealable, swellable reactive sealant composition of this invention includes: 1) monofunctional monomer(s), such as vinyl ester, acrylate, methacrylate, acrylamide, methacrylamide monomers, or a mixture of two or more of these; 2) multi-functional monomer(s), such as di, tri-, tetra-, and penta-functional monomers with vinyl, acrylate, methacrylate, acrylamide, or methacrylamide functionality, or a mixture of two or more of these; 3) reactive polymer that has unsaturation, and is capable of free radical reaction, such as styrene-butadiene-styrene (SBS), styrene-isoprene-styrene (SIS), S-I/B-S or i-SEBS-i where i is a small amount of isoprene and EB is partially hydrogenated butadiene (also known as ethylene-butylene), or a mixture of two or more of these; 4) swellable additive that swells in the presents of water, oil, other non-aqueous fluids, or combinations of these; 5) one or more free radical initiator, and 6) optional additives such as inhibitor, clay, fluid loss additive, a sag reduction agent, and/or other additives known in the art, or combinations thereof. The first 4 components add up to 100 wt. percent. The free radical initiator and the optional other components are specified in terms of 100 parts by total weight of the first four components.

Monofunctional monomers suitable with the present invention are vinyl esters, acrylates, methacrylates, acrylamides, and methacrylamides, or other monomers with functional groups susceptible to free radical polymerization, or a mixture of two or more of these. Vinyl ester includes a reactive ester, or blend of esters, having at least one carbon-carbon double bond, preferably selected from a vinyl ester of a $C_9$ to $C_{12}$ versatic acid and a vinyl ester of a long chain fatty acid, or blends thereof. Suitable vinyl ester is VeoVa 10 vinyl ester which is a vinyl ester of versatic acid represented by the formula $C_{12}H_{22}O_2$ and is a saturated monocarboxylic acid with a branched structure. It has low viscosity and is hydrophobic. It is commercially available from Momentive Specialty Chemicals Inc. Other suitable vinyl esters are known from U.S. Pat. No. 5,886,125 to DuPont. Acrylates and methacrylates such as octyl-decyl acrylate ($C_{21}H_{40}O_2$) are sold under the Sartomer brand, as well as other brands, and are also suitable monofunctional monomers. The total monofunctional monomer is in a range of 50 to 90 wt. % and preferably in the range of 50 to 75 wt. % and most preferably in a range of 55 to 70 wt. % of the re-sealing, swellable reactive sealant (components i-iv as stated above).

Multifunctional free radical reactive monomers suitable for the present invention are di-, tri-, tetra-, and penta-functional monomers with vinyl, acrylate, methacrylate, acrylamide, or methacrylamide functionality, or other monomers with functional groups susceptible to free radical polymerization, which function as cross-linkers. Suitable multifunctional monomers are tricyclodecane dimethanol diacrylate, trimethylolpropane trimethacrylate, dicyclopentadienyl methacrylate and 1,3-butylene glycol dimethacrylate ($C_{12}H_{18}O_4$), or a mixture of two or more of these. The suitable multifunctional monomers are obtained from Sartomer USA, LLC. The multifunctional monomer is present in a range of 5 to 50 wt. % and preferably in the range of 10 to 30 wt. % of the re-sealing, swellable reactive sealant (components i-iv as stated above).

The reactive unsaturated polymer may be di-, tri-, quad-copolymer (or higher) blocks of monoalkenyl arenes having 8 to 18 carbon atoms, and conjugated dienes having 4 to 12 carbon atoms. Examples of suitable monoalkenyl arenes are styrene, methylstyrene, alphamethylstyrene, propyl styrene, butyl styrene, cyclohexyl styrene, diphenyl ethylenes, and mixtures of 2 or more of these; preferred is styrene. The conjugated diene can be selected from butadiene, isoprene, piperylene, 1,3-hexadiene, or mixtures of two or more of these. The reactive polymer may be an unsaturated triblock such as styrene-butadiene-styrene, styrene-isoprene-styrene, or mixtures thereof including styrene-isoprene/butadiene-styrene. Suitable diblocks such as styrene-butadiene, styrene-isoprene, or mixtures thereof are known. Other suitable quadblocks or higher (such as pentablocks) of at least one block of mono alkenyl arene and at least one conjugated diene are also contemplated within the present invention. These block copolymers can be linear constructed by sequential polymerization of the blocks, or constructed by employing a coupling agent so that 2 or more arms of block copolymers are produced, such as $(S-B)_nX$, wherein n equals 2 to 8 arms of the block copolymer S-B, and X is the residue of a coupling agent. Such block copolymers are commercially available from Kraton Polymers. Suitable unsaturated reactive styrenic block copolymers include D1102, D1101, D1184, D1118, D1122, D1155, D1192, D0243, and DX220, but the invention is not limited by these. While all of these were satisfactory, D0243 had the best combination of solution viscosity, compressive strength and adhesive strength.

Suitable reactive unsaturated polymers useful in the present invention are styrenic block copolymers that are not hydrogenated (i.e. unsaturated) so that they are cross-linkable, have a weight average molecular weight of between 100,000 and 450,000; have a polystyrene content between 10 and 40%; a degree of branching between 2 to 4 with up to 80% di-block polymer; the vinyl content is at least 5 mol. %, and preferably between 5 and 65 mol. %, and most preferably between 8 and 58 mol. %; the polymers can be full sequential, or can be coupled, with the degree of coupling up to 90%, preferably between 10 and 80%, and more preferably between 15 and 80%. The reactive unsaturated copolymer is in the range of 1 to 15 wt. % and preferably 3 to 10 wt. % of the resealable, swellable, reactive sealant composition (components i-iv, as stated above). Other reactive unsaturated polymers may include unsaturated polyesters, natural rubber, polyisoprene, polybutadiene, styrene-butadiene rubber (SBR), ethylene-propylene-diene rubber (EPDM), or nitrile rubbers (NBR).

Reactive unsaturated polymers may also include partially hydrogenated polymer such as I-SEBS-I, which is a pentablock copolymer of isoprene-styrene-ethylene/butadiene-styrene-isoprene. This polymer has a fully or partially saturated midblock of ethylene/butadiene, and substantially-unsaturated end blocks of isoprene, of which at least 25% of the isoprene repeat units are unsaturated. It performs the functions of both a reactive unsaturated polymer and a swellable additive. Table 1 below lists the properties of two different I-SEBS-I and of an I-SEB block copolymer.

TABLE 1

Reactive and Swelling Polymer Structures.

| Sample | Structure | Molecular Weight | | | Polystyrene Content (%) | Coupling Efficiency (%) | Unsaturation Remaining | |
|---|---|---|---|---|---|---|---|---|
| | | Ip MW (kg/mol) | S MW (kg/mol) | Bd MW (kg/mol) | | | Ip (%) | Bd (%) |
| AMS 701 | I-SEBS-I | 14 | 5 | 20.4 | 12.7 | 78 | 67.4 | 35.7 |
| AMS 777 | I-SEBS-I | 5.1 | 14.4 | 37.4 | 25.3 | 76 | 54.6 | 14.7 |
| AMS 776 | I-SEB | 4.9 | 33.5 | 44.7 | 40.3 | n/a | 40.7 | 12.2 |

When these reactive and swellable polymers are completely unsaturated they cross-link very strongly and therefore they fail to swell sufficiently to achieve the minimum "at least 15% by weight swellability" as stated previously. The polymers of Table 1 are not completely unsaturated. The degree of unsaturation is shown in Table 1 where the remaining unsaturation of butadiene ranges from about 12 to about 35% and the unsaturation of the isoprene ranges from about 40 to about 67%.

Additives that are swellable in the presence of oil or other non-aqueous fluids are saturated polymers that include hydrogenated styrenic block copolymers, with and without oil, such as naphtha oil or mineral oil. Examples of suitable swellable additives in the presence of oil are hydrogenated styrene-butadiene-styrene block copolymer (SEBS), hydrogenated styrene-isoprene-styrene block copolymer (SEPS), hydrogenated styrene-isoprene/butadiene-styrene (SEEPS), maleic anhydride functionalized SEBS (MA-SEBS), isoprene-styrene-hydrogenated butadiene-styrene-isoprene block copolymer (I-SEBS-I) and mixtures of two or more of these, available from Kraton Polymers and generally identified as Kraton G and/or FG type block copolymers. Other additives that are swellable in the presence of oil may include hydrogenated nitrile rubber (HNBR), or hydrogenated natural rubber, butyl rubber, or silicone rubbers. It is noted that I-SEBS-I mentioned above can be a suitable reactive ingredient via the unsaturation in the isoprene end blocks and also a suitable swellable additive ingredient via the saturated SEBS blocks. The swellable polymer is present in a range of 1 to 15 wt. % of the resealable, swellable, reactive sealant composition (the four components i-iv). When I-SEBS-I is employed for both the reactive and swellable polymer it is employed in a range of 2 to 30 wt. % (merely the addition of the amounts for the reactive unsaturated polymer and the swellable polymer) of the resealable, swellable, reactive sealant composition.

Polymers that are swellable in the presence of water are acrylic or methacrylic polymers such as polyacrylamide. These polymers are often referred to as superabsorbent polymer, such as Carbopol® polymers from Lubrizol Co. However not all such polymers are absorbent in the presence of salt water. Certain gelled superabsorbent polymers can be broken by the addition of salt. To gel salt water, atapulgite clay is normally employed in place of the swellable polymer, as the swellable additive. Atapulgite clay can be purchased from M-I Swaco, a Schlumberger Co. These additives swell in the presence of water.

A free-radical initiator is necessary in the application of the present invention. The use of initiators is known in the art and the invention is not intended to be limited to any particular type. Suitable free radical initiating systems may include, for example, but not be limited to azo compounds, alkyl or acyl peroxides or hydroperoxides, ketoperoxides, peroxy esters, peroxy carbonates, peroxy ketals, or mixtures thereof. Such compounds vary with respect to activation temperature and half-life or, in other words, the temperature at which their reaction is initiated and becomes extensive. Examples of suitable alkyl peroxides, dialkyl peroxides, hydroperoxides, acyl peroxides, peroxy esters and peroxy ketals include, but are not limited to benzoyl peroxide, dibenzoyl peroxide, diacetyl peroxide, di-t-butyl peroxide, cumyl peroxide, dicumyl peroxide, dilauryl peroxide, t-butyl hydroperoxide, methyl ketone peroxide, acetylacetone peroxide, methylethyl ketone peroxide, dibutylperoxyl cyclohexane, di-(2,4-dichlorobenzoyl) peroxide, diisobutyl peroxide, t-butyl perbenzoate, and t-butyl peracetate, or mixtures thereof. The initiator may be employed in the curable sealant composition in total amounts from about 0.05 to about 5.0 phr (parts per hundred parts rubber) where "rubber" equals the resealable, swellable, reactive sealant composition (the components i-iv), and preferably 0.3 to 3 phr of the curable sealant composition.

Other ingredients may also be beneficial depending on the environment of the oil well. For example a scorch protection additive such as those sold under the Arkema brand could be used to reduce temperature effects and allow for better control of the thickening time and mechanical properties.

Likewise an inhibitor may be another optional ingredient and the invention is not intended to be limited to any particular inhibitor. Those skilled in the art would recognize suitable inhibitors. Examples of suitable inhibitors for free radical polymerization reactions include, for example, benzoyl quinone, parabenzoquinone, tertiary butyl catechol, and the like, and mixtures thereof, which exhibit efficacy at elevated temperatures. Some inhibitors are not adequately effective at elevated temperatures. Additional examples of inhibitors include hydroquinones, such as, for example methyl hydroquinone and methyl ethyl hydroquinone. The quantity of inhibitor is adapted to the reactive, polymerizable polymer and monomer components in question, including the desired pot life and curing time. In general the optional inhibitor may be present in a quantity from about 0.02 to 2 phr of the resealable, swellable, reactive sealant composition (components i-iv as stated above). The preferred quantity results in the proper right angle exothermic process. In a right angle exothermic process the liquid quickly cures to a solid, at variable curing time, so that the reactive sealant composition can be adjusted and "dialed-in" for each well. Such a process give a right angle cure or set as evidenced by a sharp upturn in a consistency versus time graph which approximates a 90° angle.

When the temperature in the well is elevated, for example, higher than 150° C., the reaction may proceed too fast. At such high temperatures the inhibitor acts as a free radical scavenger and prevents the polymerization from proceeding too fast. Eventually the inhibitor may be used up and the free radical groups then initiate polymerization which is subsequently self-sustaining. In some high temperature wells the inhibitor can only decrease the reactivity a limited amount.

Where the inhibitor has limited effectiveness there may be a negative impact on the molecular weight and extent of cross-linking in the resealable, swellable, reactive sealant composition in that it is lower than would be optimally desirable.

Other useful additives, other than inhibitor, may be organophilic clay (such as Bentone® 38 or Claytone® SF) or other suspending agents for solid suspension, fluid loss additive to prevent loss of fluids to the formation, coupling agents, dyes, functional styrenic block copolymer, and lost circulation materials to prevent large losses of fluid to the formation. The total weight of these other optional additives is from 0 to 10 phr of the resealable, swellable, reactive sealant composition (components i-iv as stated above).

Weighting agents (high or low density additives) may be added to the curable, resealable, swellable, reactive sealant composition. The amount of weighting agent varies for each well but it is never part of the calculations for the curable, resealable, swellable, reactive sealant composition. Suitable high density materials include, for example, galena, hematite, magnetite, iron oxides, ilmenite, barite, siderite, celestite, dolomite, calcite, manganese oxides, magnesium oxide, zinc oxide, zirconium oxides, spinels and the like. Generally these high density additives have a specific gravity of from 2.6 to about 15. The preferred high density weighting agent is barite—barium sulfate.

Weighting agents that are low density additives make the resealable, swellable, reactive sealant composition lighter in weight. Suitable low density additives include glass bubbles, such as those sold by 3M, or expanded microspheres such as those sold under the tradename Expancel by Akzo Nobel. Other suitable low density additives that can withstand the conditions of the well as well as being compatible with the ingredients of the resealable, swellable, reactive sealant composition would be suitable. Generally these low density additives would make the composition have a specific gravity of less than its value without any weighting additives, down to a value of about 0.8.

EXAMPLES

Example 1

Demonstration of Rheology, Thickening Time, and Compressive Strength

Example 1 was prepared according to the composition given in Table 2. The monofunctional monomer was VeoVa 10; the multifunctional monomer was SR297 (1,3-butyleneglycol dimethacrylate). The reactive polymer was D0243 (SBS); the swellable polymer was FG1901 (MA-SEBS). The sample was then weighted to 12.5 lb/gal with Barimite XF barium sulfate. The purpose of this Example was to demonstrate solution rheology, as well as control over thickening time, and the ability to retain rheology and compressive strength in the presence of oil-based fluid contamination. The fluid used to contaminate the sample was a 12.5 lb/gal Rheliant synthetic-based mud (SBM) obtained from M-I Swaco. Samples of Example 1 were contaminated with 20, 40, 60, and 80 wt. % SBM, wherein the remainder of 80, 60, 40, and 20 wt. %, respectively, of the samples were the composition set forth in Table 2.

TABLE 2

Example 1 Composition.

| Component (wt. %) | 1 |
|---|---|
| VeoVa 10 | 55.75 |
| SR297 | 36.75 |
| D0243 | 6.5 |
| FG1901 | 1.0 |
| Luperox 231 (phr) | 0.5 |

Rheology measurements were made using a Fann Model 35 viscometer. The shear stress measurements were made at 3, 6, 100, 200, 300 and 600 rpm at 77° F. and 150° F.; the 10 second and 10 minute gel strength measurements were made at 3 rpm at 77° F. and 150° F. The results are reported as Dial Readings in units of lb./100 ft$^2$. The dial readings were used to calculate the Plastic Viscosity (PV=DR$_{600}$−DR$_{300}$; cP) and Yield Point (YP=PV−DR$_{300}$; lbs/100 ft$^2$). The results are reported in Tables 3 and 4. For some of the samples, the 600 rpm reading was not recorded, and so PV and YP could not be calculated.

TABLE 3

Example 1 Rheology at 77° F.

| Rheology (12.5 ppg) | EX. 1, 0% SBM | EX. 1, 20% SBM | EX. 1, 40% SBM | EX. 1, 60% SBM | EX. 1, 80% SBM | 100% SBM |
|---|---|---|---|---|---|---|
| 600 rpm | — | — | 93 | 63 | 71 | — |
| 300 rpm | 74 | 80 | 50 | 34 | 38 | 31 |
| 200 rpm | 51 | 56 | 35 | 24 | 27 | 23 |
| 100 rpm | 26 | 30 | 19 | 13 | 16 | 14 |
| 6 rpm | 3 | 47 | 3 | 2 | 3 | 3 |
| 3 rpm | 2 | 6 | 2 | 1 | 2 | 2 |
| PV | — | — | 43 | 29 | 13 | — |
| YP | — | — | 7 | 5 | 5 | — |
| 10 sec | 2 | 4 | 2 | 1 | 2 | 3 |
| 10 min | 3 | 6 | 5 | 3 | 5 | 6 |

TABLE 4

Example 1 Rheology at 150° F.

| Rheology (12.5 ppg) | EX. 1, 0% SBM | EX. 1, 20% SBM | EX. 1, 40% SBM | EX. 1, 60% SBM | EX. 1, 80% SBM | 100% SBM |
|---|---|---|---|---|---|---|
| 600 rpm | — | — | 43 | 27 | 32 | — |
| 300 rpm | 32 | 30 | 25 | 16 | 19 | 17 |
| 200 rpm | 23 | 21 | 18 | 11 | 14 | 13 |
| 100 rpm | 12 | 14 | 10 | 7 | 9 | 8 |
| 6 rpm | 2 | 9 | 3 | 1 | 2 | 3 |
| 3 rpm | 2 | 5 | 2 | 1 | 2 | 2 |
| PV | — | — | 18 | 11 | 13 | — |
| YP | — | — | 7 | 5 | 6 | — |
| 10 sec | 2 | 6 | 2 | 1 | 2 | 3 |
| 10 min | 3 | 8 | 3 | 2 | 3 | 4 |

Figure 1:
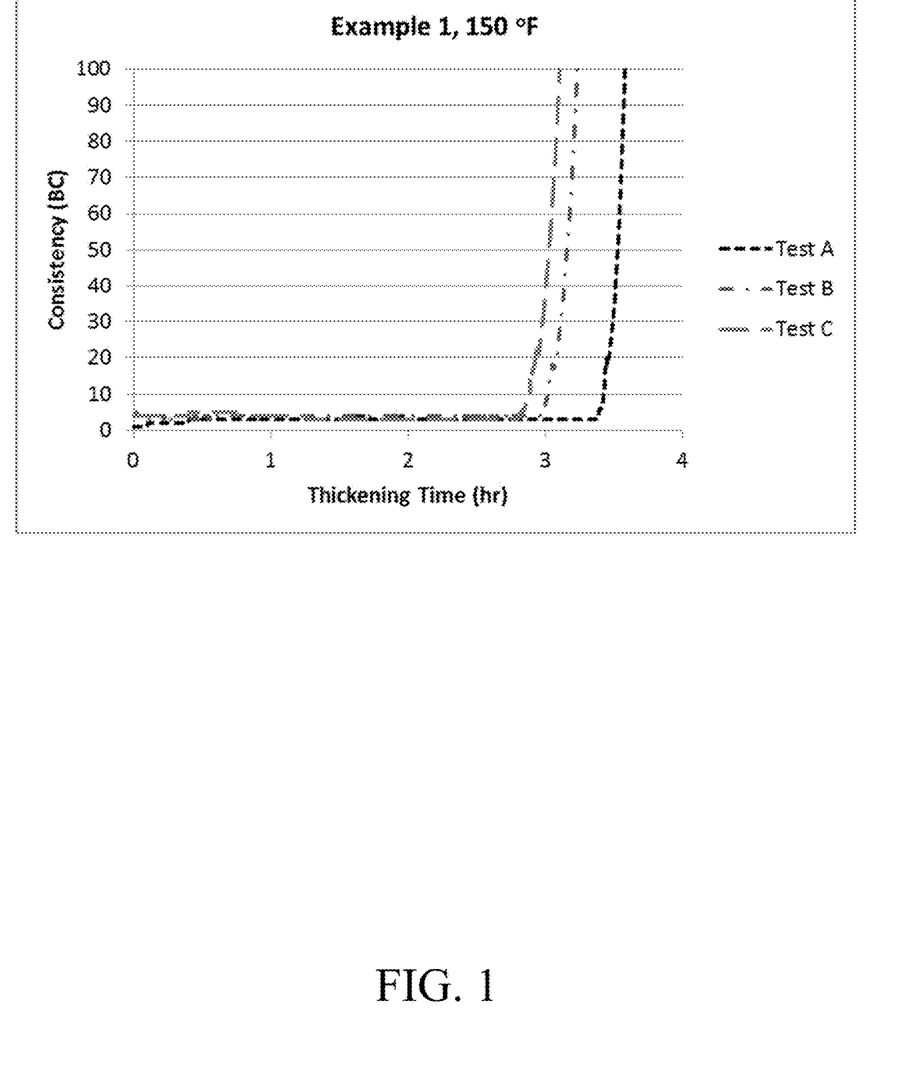
FIG. 1 is a graph illustrating right angle cure in Bearden Consistency units (BC) versus time in hours and minutes at 150° F. and 10,000 psi for Example 1, Tests A-C.
Figure 2:
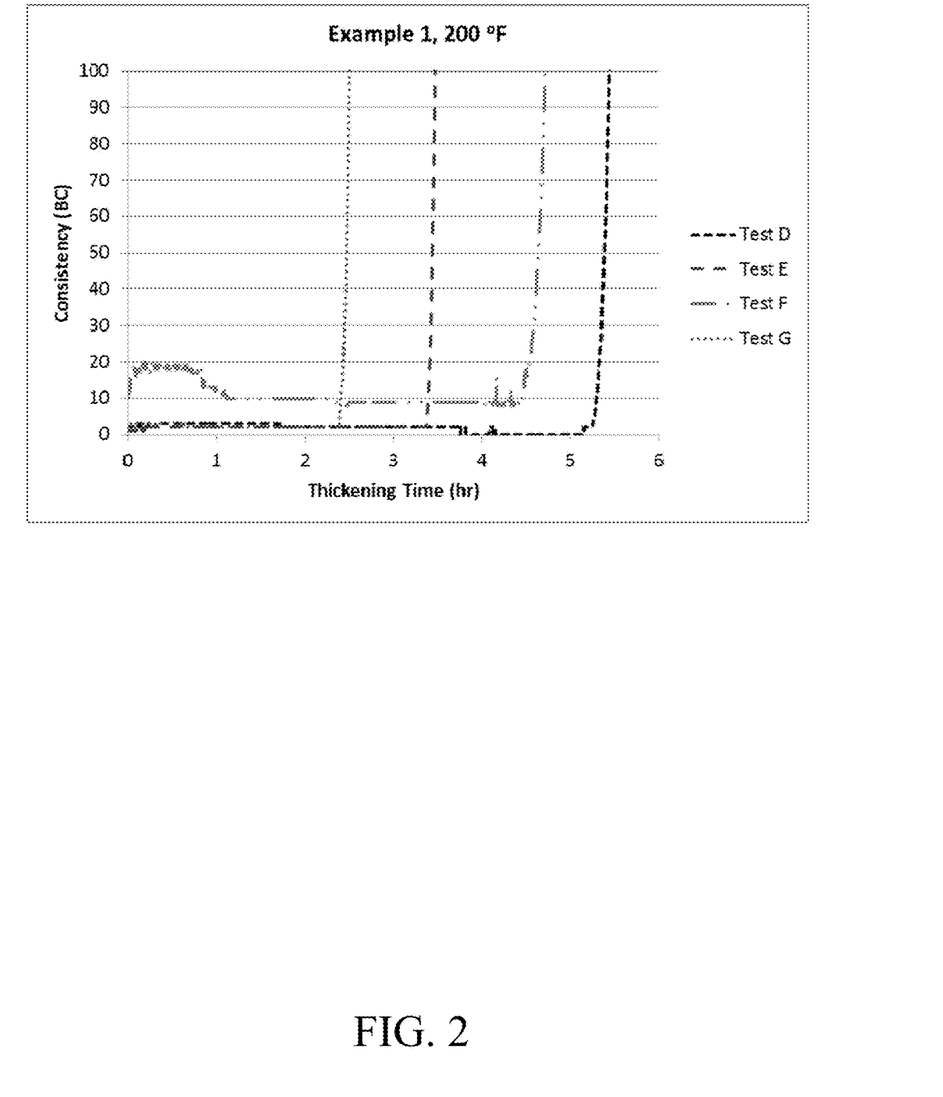
FIG. 2 is a graph illustrating right angle cure in Bearden Consistency units (BC) versus time in hours and minutes at 200° F. and 10,000 psi for Example 1, Tests D-G.

Thickening Times for Example 1 were obtained on a Chandler Pressurized Consistometer and are shown in FIGS. 1-2; the thickening times (time to 70 BC) and test conditions are reported in Table 5. The tests were conducted at either 150 or 200° F. and at 10,000 psi, with the temperature and pressure increasing to the set point over 60 minutes. Example 1 samples tested at 150° F. (tests A, B, and C) were weighted to 9, 12.5, and 14 ppg with Barimite XF barium sulfate, and were initiated with 0.75 phr Luperox ACP35 (FIG. 1). The three curves show a "right angle" set occurring, where the transition from the liquid state (initial BC) to the "thickened state" (70 BC) happens over a very short period of time. This data set shows a slight increase in thickening time with increasing density, from 3:13 (hr:min) for the 9 ppg sample to 3:03 (hr:min) for the 14 ppg sample. Example 1 samples tested at 200° F. were weighted to either 9 ppg (tests D and E) or 12.5 ppg (tests F and G) with Barimite XF barium sulfate. All four samples showed right angle sets—see FIG. 2. For the 9 ppg samples, they were initiated with 1.0 (test D) or 3.0 (test E) phr VulCup 40KE; with 1.0 phr, the thickening time was 5:24 (hr:min), whereas the sample containing 3.0 phr had a faster thickening time of 3:27 (hr:min), thus demonstrating the ability to control the thickening time through changing the concentration of initiator. The samples weighted to 12.5 ppg demonstrate the ability to control the thickening time by choice of initiator; both samples were cured using 1.0 phr, but with either VulCup 40KE (test F) or Luperox 230XL40 (test G). The VulCup 40KE sample had a thickening time of 4:40 (hr:min), whereas the Luperox 230XL40 sample had a thickening time of 2:29 (hr:min).

TABLE 5

Thickening Time Data for Example 1.

| Test | A | B | C | D | E | F | G |
|---|---|---|---|---|---|---|---|
| Temperature (° F.) | 150 | 150 | 150 | 200 | 200 | 200 | 200 |
| Density (ppg) | 9 | 12.5 | 14 | 9 | 9 | 12.5 | 12.5 |
| Initiator Type | Luperox ACP35 | Luperox ACP35 | Luperox ACP35 | VulCup 40KE | VulCup 40KE | VulCup 40KE | Luperox 230XL40 |
| Initiator Amount (phr) | 0.75 | 0.75 | 0.75 | 1.0 | 3.0 | 1.0 | 1.0 |
| Thickening Time (hr:min) | 3:33 | 3:11 | 3:03 | 5:24 | 3:27 | 4:40 | 2:29 |

Figure 3:
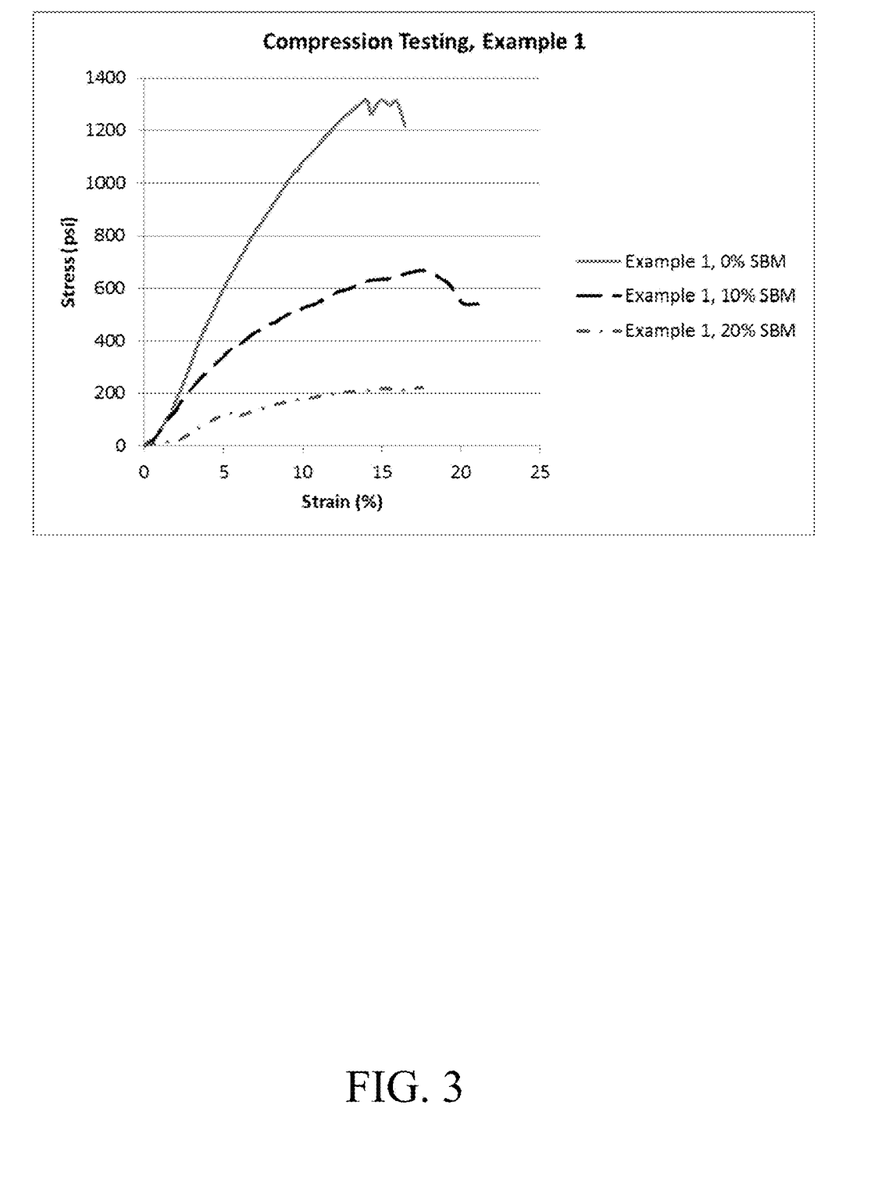
FIG. 3 is a graph of stress in psi versus strain in percent for Example 1 with 0, 10, and 20% synthetic-based mud contamination.

Samples of Example 1 were contaminated with 0, 10, 20, 30, 40, and 50 wt. % SBM (12.5 ppg Rheliant drilling fluid), wherein the remainder of 100, 90, 80, 70, 60, and 50 wt. %, respectively, of the samples were the composition set forth in Table 1, weighted to 12.5 ppg with Barimite XF barium sulfate. The samples were initiated with 1.0 phr Luperox 230XL40, and cured in a 2"×2" metal tin for 24 hours at 93° C. (200° F.) under 600 psi $N_2$. These samples were then tested using an Instron HR 6316 universal testing machine under compression at 16,000 lbf/min, according to API RP 10B-2. The results are given in Table 6 and the stress versus strain curves shown in FIG. 3.

TABLE 6

Compressive Strength of Example 1 with SBM Contamination.

| % SBM | Compressive Strength (psi) |
|---|---|
| 0 | 1330 |
| 10 | 555 |
| 20 | 258 |
| 30 | 173 |
| 40 | 65 |
| 50 | 25 |

Example 2 and Example 3

Demonstration of Elasticity, Toughness, and Strength

Example 2 was prepared according to the present invention and reported in Table 7. The low viscosity monofunctional monomer was VeoVa 10; the multifunctional monomers were SR297 (1,3-butyleneglycol dimethacrylate) and SR833 (tricyclodecane dimethanol dimethacrylate). The reactive polymer was D0243 (SBS); the swellable polymer was FG1901 (MA-SEBS). The sample was then weighted to 14 lb/gal with Barimite XF barium sulfate. The sample was cured with 1.0 phr VulCup 40KE at 93° C. (200° F.) for 24 hours.

TABLE 7

Ex. 2 Composition.

| Component | 2 |
|---|---|
| VeoVa 10 | 74.5 |
| SR297 | 13 |
| SR833S | 5.0 |
| D0243 | 6.5 |
| FG1901 | 1.0 |

TABLE 7-continued

Ex. 2 Composition.

| Component | 2 |
|---|---|
| VulCup 40KE (phr) | 1.0 |

Example 3 is an example of a 14 ppg cement slurry that may be used in a well with a bottom hole static temperature (BHST) of 25° F.; the composition of this slurry is reported in Table 8. The concentration units used are By Weight of Cement (BWOC), By Weight of Water (BWOW), gallons per sack (gal/sack). The sample was cured at 120° C. (250° F.) for 24 hours.

TABLE 8

Example 3 Formulation.

| Material | Concentration |
|---|---|
| TXI Lightweight cement | 100% BWOC |
| EZ-FLO | 0.27% BWOC |
| D-Air 3000 | 0.25% BWOC |
| Fresh (Drill) Water | 6.11 gal/sack |
| Salt | 23.0% BWOW |
| HALAD-567 LXP | 0.20 gal/sack |
| SCR 100L | 0.05 gal/sack |

Figure 4:
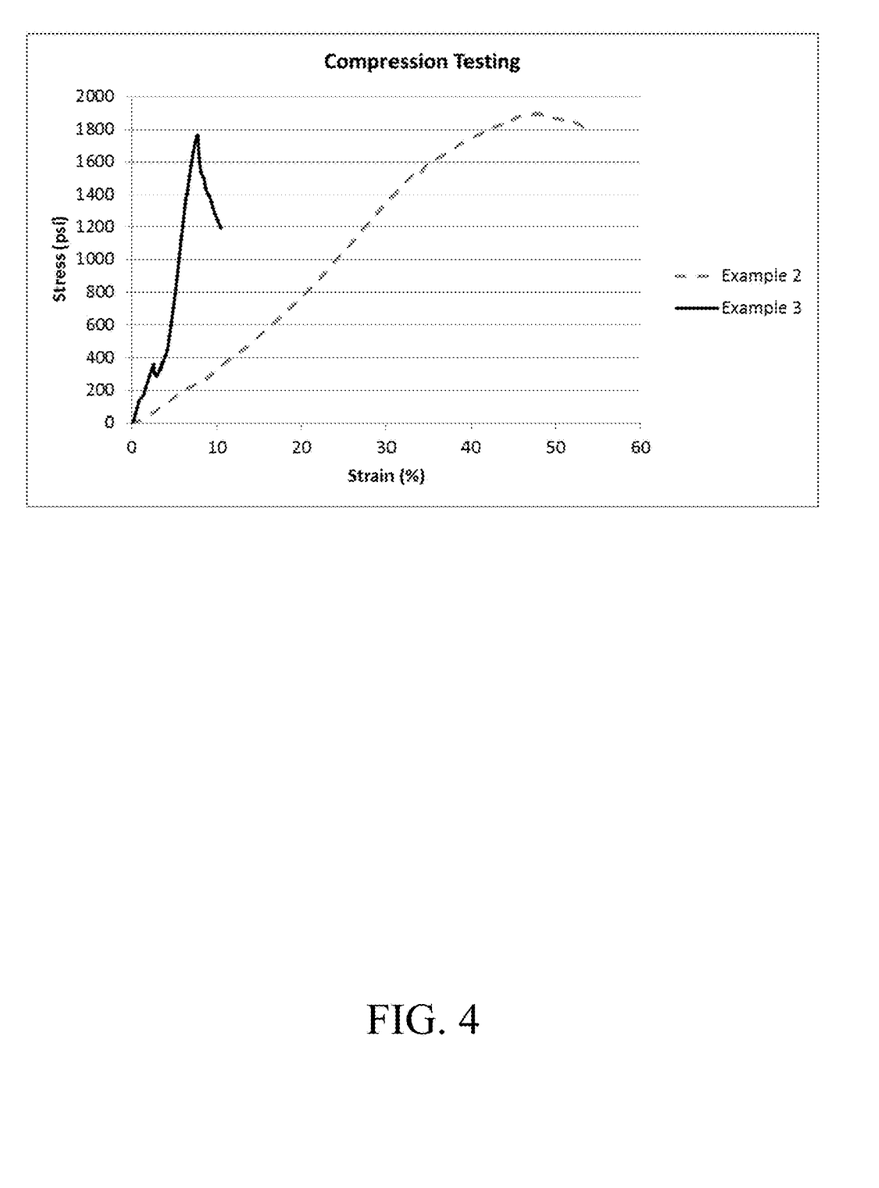
FIG. 4 is a graph of stress in psi versus strain in percent for Examples 2 and 3 demonstrating compressive strength and toughness between the reactive sealant and traditional cement.

Representative compressive strength data for both Examples 2 and 3 is shown in FIG. 4. The compressive strength for Example 2 is 1896 psi with strain at break of 48%, and the compressive strength for Example 3 is 1767 psi with strain at break of 7.7%. While both samples have similar ultimate compressive strength, Example 2 withstands much higher levels of deformation before fracture (48% strain for the resealable, swellable reactive sealant versus 7.7% strain for the cement sample). The Young's modulus is a measure of stiffness of a material, and can be calculated from the slope of the linear elastic region in a stress versus strain curve. The Young's modulus of Example 2 is 3,760 psi, whereas the Young's modulus of Example 3 is 19,024 psi; this means that Example 2 is much more flexible than Example 3. Toughness of a material can be quantified by taking the area under the stress-strain curve at the fracture point. As can be seen in FIG. 4, the area under the stress-strain curve for Example 2 is much greater than that of Example 3. This means that it takes significantly more energy per unit volume to fracture Example 2 as compared to the cement sample (Example 3); toughness may be a better indication of overall performance and functional lifetime of the material than just compressive strength alone.

Examples 4-13

Demonstration of Swelling in Oil (Escaid 110 Mineral Oil)

Examples 4-13 were prepared according to Table 9 below. The monofunctional monomer was VeoVa 10; the multifunctional monomers were SR297 (1,3-butyleneglycol dimethacrylate) and SR833 (tricyclodecane dimethanol dimethacrylate). The reactive polymer was either D0243 (SBS) or AMS 777 (I-SEBS-I); the swellable polymer was either G1654 (SEBS), G1726 (SEBS) or AMS 777 (I-SEBS-I). Once mixed, a small amount of unweighted fluid was set aside; the remaining solution was weighted to 12.5 lb/gal with Barimite XF barium sulfate. To both the unweighted and the weighted solutions was added 0.75 phr (parts per hundred rubber) Luperox ACP35, where "rubber" is the reactive sealant composition. Duplicates of each sample were cured at 150° F.). (65° for 24 hours under 300 psi N2 to be tested for swellability in oil and for storage modulus via Dynamic Mechanical Analysis (DMA). For the swelling test, each sample was cut into three pieces; for each piece, the starting weight was measured and recorded. The samples were then submerged in mineral oil (Escaid 110) for 24 hours at ambient temperatures, after which the weight of the sample post-swelling was recorded and the change in weight reported. In addition to swelling tests, cured samples of both the unweighted and weighted formulations were analyzed via DMA with a TA Instruments Q800; the samples were oscillated under tension at a frequency of 1 Hz with an amplitude of 10 μm from 25-150° C. at a rate of 3° C./min. This type of oscillatory dynamic measurement allows for both the storage modulus and loss modulus to be measured. The modulus values reported in Table 9 are the Storage Modulus at 30° C. for each sample.

TABLE 9

Examples 4-9, and Comparative Examples 10-13, Demonstration of Swelling in Oil.

| Component (wt. %) | | Reactive + Swellable | | | Reactive & Swellable | | | Reactive Only | | | Swellable Only |
|---|---|---|---|---|---|---|---|---|---|---|---|
| | | 4 | 5 | 6 | 7 | 8 | 9 | 10 | 11 | 12 | 13 |
| VeoVa 10 | | 56 | 61 | 75 | 56 | 61 | 75 | 56 | 61 | 75 | 55.5 |
| SR297 | | 37 | 27 | 13 | 37 | 27 | 13 | 37 | 27 | 13 | 37 |
| SR833 | | — | 5 | 5 | — | 5 | 5 | — | 5 | 5 | — |
| D0243 | | 3.5 | 3.5 | 3.5 | — | — | — | 7 | 7 | 7 | — |
| G1654 | | 3.5 | 3.5 | 3.5 | — | — | — | — | — | — | — |
| AMS 777 | | — | — | — | 7 | 7 | 7 | — | — | — | — |
| G1726 | | — | — | — | — | — | — | — | — | — | 7.5 |
| Luperox ACP35 (phr) | | 0.75 | 0.75 | 0.75 | 0.75 | 0.75 | 0.75 | 0.75 | 0.75 | 0.75 | 0.75 |
| Unweighted (~7.8 ppg) | Modulus, (MPa) | 57.5 | 37.0 | 3.6 | 48.8 | 31.7 | 8.4 | 45.3 | 23.7 | 3.9 | 27.7 |
| | Swelling, (wt. %) | 16.4 | 15.7 | 48.9 | 52 | 63 | 105 | 5.7 | 7.3 | 14.7 | −5.8 |
| 12.5 ppg | Modulus, (MPa) | 170 | 107 | 31.3 | 119 | 108 | 33.8 | 391 | 382 | 63.8 | 183 |
| | Swelling, (wt. %) | 4.4 | 4.9 | 16.6 | 1.1 | 3.7 | 19.7 | 0 | 0.1 | 1.3 | 0.7 |

Examples 4-6 contain both a reactive polymer (D0243, SBS) and a swellable polymer (G1654, SEBS), Examples 7-9 contain a polymer capable of both reacting and swelling (AMS 777, I-SEBS-I), Examples 10-12 contain only a reactive polymer (D0243, SBS), and Example 13 contains only a swellable polymer (G1726, SEBS). For each of the first three types of examples (reactive plus swellable, reactive and swellable, reactive only), three different formulations were used: a high modulus, medium modulus, and low modulus formula. For instance, in the first set, Example 4 is a "high modulus" formulation with a storage modulus of 57.5 MPa, Example 5 is a "medium modulus" formulation with a storage modulus of 37.0 MPa, and Example 6 is a "low modulus" formulation with a storage modulus of 3.6 MPa. A similar trend can be seen for Examples 7-9 and Examples 10-12; Example 13 is similar to the "high modulus" formulation.

For all four types of polymer systems, the amount of swelling increases as the modulus of the formulation decreases, demonstrating the importance of a low modulus, flexible material to allow for the system to swell and expand in the presence of a suitable fluid. For instance, this can be seen in Examples 7-9, which contain a polymer capable of both reacting and swelling: these samples have unweighted modulus values of 48.8, 31.7, and 8.4 MPa, respectively, and unweighted swelling of 52, 63, and 105 wt. %, respectively. For all samples the modulus increased when the formulation was weighted to 12.5 lb/gal, and the extent of swelling decreased accordingly. For instance, in Examples 7-9, the weighted modulus values increased to 119, 108, and 33.8 MPa, respectively, and the weighted swelling decreased to 1.1, 3.7, and 19.7 wt. %, respectively.

The control samples with only a reactive polymer (Examples 10-12) had weighted swelling values of 0, 0.1, and 1.3 wt. %, respectively; as the reactive sealant needs to swell enough to account for any loss in volume as a result of the curing process, these samples likely do not swell enough to meet the desired performance requirements. A second type of control sample with only the swellable polymer (Example 13) showed a loss in weight in the unweighted sample after soaking in oil (−5.8 wt. %); this is likely due to the swellable polymer being soluble in oil while at the same time not being chemically cross-linked into the polymer matrix. As shown in both types of control examples, the reactive sealant composition needs both a reactive polymer and a swellable polymer to perform as designed.

Example 14

Demonstration of Rheology, Curing, and Swelling

Example 14 was a formulation according to the invention, reported in Table 10. The monofunctional monomer was VeoVa 10, the multifunctional monomer was SR297 (1,3-butylene glycol dimethacrylate), and both the reactive and swellable polymer was AMS 776 (I-SEB). After mixing these components, the samples were weighted to 12.5 lb/gal with Barimite XF barium sulfate. To the weighted solution was added 0.75 µhr (parts per hundred rubber) Luperox ACP35, where "rubber" is the reactive sealant composition. Duplicates of each sample were cured at 150° F. (65° C.) for 24 hours under 400 psi $N_2$ to be tested for swellability in oil and for storage modulus via Dynamic Mechanical Analysis (DMA). For the swelling test, each sample was cut into three pieces; for each piece, the starting weight was measured and recorded. The samples were then submerged in mineral oil (Escaid 110) for 24 hours at ambient temperatures, after which the weight of the sample post-swelling was recorded and the change in weight reported (Table 10). In addition to swelling tests, cured samples of both the unweighted and weighted formulations were analyzed via DMA with a TA Instruments Q800; the samples were oscillated under tension at a frequency of 1 Hz with an amplitude of 10 µm from 25-150° C. at a rate of 3° C./min. This type of oscillatory dynamic measurement allows for both the storage modulus and loss modulus to be measured. The modulus value reported is the Storage Modulus at 30° C. (Table 10).

TABLE 10

Example 14 Composition.

| Component (wt. %) | 14 |
|---|---|
| VeoVa 10 | 56.1 |
| SR297 | 37.4 |
| AMS 776 | 6.5 |
| Luperox ACP35 (phr) | 0.75 |
| Modulus, 12.5 ppg (MPa) | 231 |
| Swelling, 12.5 ppg (wt. %) | 7.8 |

Rheology measurements were made using a Fann Model 35 viscometer. The shear stress measurements were made at 3, 6, 100, 200, 300 and 600 rpm at 77° F. and 150° F.; the 10 second and 10 minute gel strength measurements were made at 3 rpm at 77° F. and 150° F. The results are reported as Dial Readings in units of lb./100 ft². The dial readings were used to calculate the Plastic Viscosity (PV=$DR_{600}$−$DR_{300}$; cP) and Yield Point (YP=PV−$DR_{300}$; lbs/100 ft²). The results are reported in Table 11.

TABLE 11

Example 14 Rheology at 77° F.

| Rheology (12.5 ppg) | EX. 14 |
|---|---|
| 600 rpm | 175 |
| 300 rpm | 106 |
| 200 rpm | 76 |
| 100 rpm | 42 |
| 6 rpm | 3 |
| 3 rpm | 2 |
| PV | 69 |
| YP | 37 |
| 10 sec | 3 |
| 10 min | 4 |

Example 15 and Comparative Example 16, Ability to Reseal

Example 15 was a formulation according to the invention, reported in Table 12. The monofunctional monomer was VeoVa 10, the multifunctional monomer was SR297 (1,3-butylene glycol dimethacrylate), and both the reactive and swellable polymer was AMS 701 (I-SEBS-I). Comparative Example 16 was similar to Example 15, but with no swellable additive, only a reactive polymer (D0243, SBS). After mixing these components, the samples were weighted to 12.5 lb/gal with Barimite XF barium sulfate.

TABLE 12

Ex. 15 and Comparative Ex. 16 Compositions.

| Component (wt. %) | 15 | 16 |
|---|---|---|
| VeoVa 10 | 55.5 | 55.5 |
| SR297 | 37 | 37 |
| AMS 701 | 7.5 | — |
| D0243 | — | 7.5 |
| Luperox 231 (phr) | 0.5 | 0.5 |

Examples 15 and 16 were cured using 0.5 phr Luperox 231 organic peroxide in galvanized steel pipe with 1½" outer diameter×6" length at 120° C. (250° F.) under 600 psi $N_2$ for 24 hours, resulting in plugs that were 1⅝" diameter and 4" in length. The cured Example 15 sample was cooled to room temperature, and showed noticeable shrinkage and cracking. The sample was then tested on a pressure testing apparatus; this apparatus included a compressed air supply line, a release valve, a digital recordable pressure gauge between the two, an adapter to the pipe containing the sample, followed by another adapter from the sample pipe to an outlet line that could be submerged in water to observe bubbling if air passed through the sample. Initially, the Example 15 sample did not hold any pressure.

The sample was then soaked in Escaid 110, a mineral oil, for one week; after soaking in oil, the Example 15 sample had noticeably swelled and the original gaps/cracks were filled. The sample was tested on the pressure testing apparatus, and held pressure at 25 psi for 30 minutes. The pressure was then increased, and bubbles were observed on the outlet side of the testing apparatus at 30 psi; full communication was reached at 40 psi, meaning that a steady stream of bubbles was observed, indicating that new cracks/pathways had developed. The sample was again soaked in oil for one week (total of two weeks). The sample was re-tested, and held pressure to 40 psi; full communication was reached at 70 psi. The sample was soaked for an additional week (total of three weeks), and re-tested.

Figure 5:
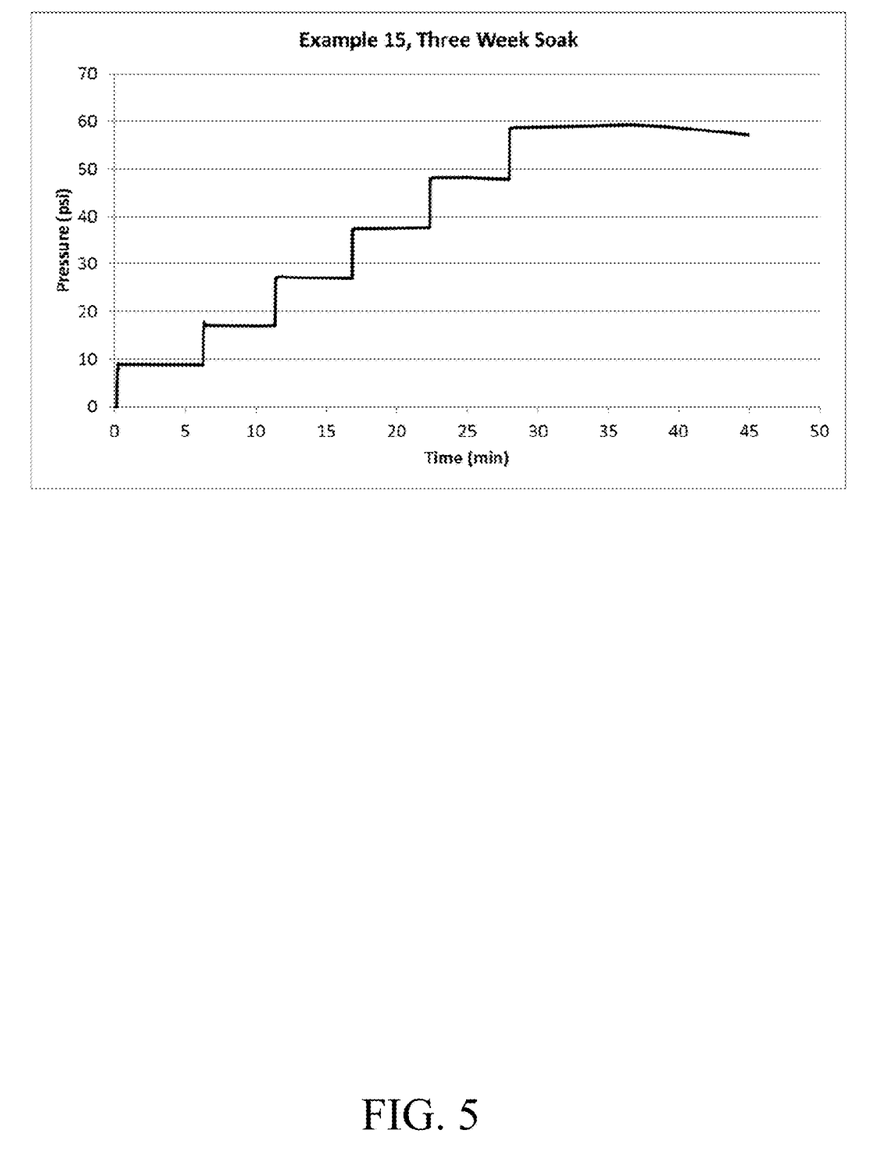
FIG. 5 is a graph of pressure in psi versus time in min. for Example 15 after a three week oil soak.

The data from the three week soak pressure test for Ex. 15 is shown in FIG. 5. The pressure was increased over a 30 minute period in roughly 10 psi increments; the sample was held at each interval for at least 5 minutes before proceeding. After 30 minutes, the sample was held at 60 psi; at the 32 minute mark, the first signs of bubbles were observed. At the 37 minute mark, the supply valve was closed, and pressure was allowed to decrease slowly; the test was stopped at the 45 minute mark. This series of tests demonstrate the ability of the sample to not only swell in the presence of oil to overcome the volumetric shrinkage from the curing process and form a seal, but to also then re-seal after testing to failure and soaking in oil multiple times, each time allowing the sample to swell and re-seal.

The Comparative Example 16 sample was cured under similar conditions, and once cooled to room temperature also showed noticeable shrinkage. The sample was tested on the pressure apparatus and initially did not hold any pressure. The sample was then soaked in Escaid 110 mineral oil for one week. The sample was re-tested on the pressure testing apparatus, and still did not hold any pressure. Hence, Comparative Example 16, when compared to Example 15, shows the necessity and utility of the swellable component in the re-sealable, swellable reactive sealant composition.

Thus it is apparent that there has been provided, in accordance with the invention, a curable, re-sealable, swellable reactive sealant composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

What is claimed is:

1. A curable sealant composition, comprising: a resealable, swellable, reactive sealant and free radical initiator, said resealable, swellable, reactive sealant comprising
    i) from about 50 to about 90 wt. % of a monofunctional monomer susceptible to only one free radical reaction;
    ii) from about 5 to about 50 wt. % of a multifunctional monomer having multiple species susceptible to free radical reaction;
    iii) from about 1 to about 15 wt. % reactive unsaturated polymer;
    iv) from about 1 to about 15 wt. % of a swellable additive; and
    v) from 0 to about 10 wt. % of other optional components, based on the total wt. of all components i to iv, totaling 100 wt. %,
wherein upon curing the composition, when contacted with oil and/or water, swells by equal to or greater than 15% of the weight of the composition prior to contact with the oil and/or water.

2. The curable sealant composition of claim 1, comprising from about 0.25 to about 3 wt. % of said free radical initiator based on 100 parts by weight of the resealable, swellable, reactive sealant.

3. The curable sealant composition of claim 1, wherein said monofunctional monomer is a vinyl ester derivative of versatic acid with a $C_9$-$C_{12}$ carbon atoms, or a monoacrylate, monomethacrylate, monoacrylamide, or monomethacrylamide.

4. The curable sealant composition of claim 3, wherein said vinyl ester derivative of versatic acid is represented by the formula $C_{11}H_{20}O_2$ or $C_{12}H_{22}O_2$.

5. The curable sealant composition of claim 1, wherein said multifunctional monomer are di-, tri-, tetra-, and/or penta-functional monomers with vinyl, acrylate, methacrylate, acrylamide, or methacrylamide functionality.

6. The curable sealant composition of claim 5, wherein said multifunctional monomers are tricyclodecane dimethanol diacrylate, trimethylolpropane trimethacrylate, 1,3-butylene glycol dimethacrylate, or a mixture thereof.

7. The curable sealant composition of claim 1, wherein said reactive unsaturated polymer is a styrenic block copolymer such as styrene-butadiene-styrene block copolymer, styrene-isoprene-styrene block copolymer, styrene-isoprene/butadiene-styrene block copolymer, isoprene-styrene-hydrogenated butadiene-styrene-isoprene block copolymer, and mixtures of two or more of these.

8. The curable sealant composition of claim 1, wherein said swellable additive capable of swelling in the presence of hydrocarbons is selected from the group of saturated block copolymers such as hydrogenated styrene-butadiene-styrene block copolymer, hydrogenated styrene-isoprene-styrene block copolymer, hydrogenated styrene-isoprene/butadiene-styrene block copolymer, and isoprene-styrene-hydrogenated butadiene-styrene-isoprene block copolymer, or a mixture of two or more of these.

9. The curable sealant composition of claim 1, wherein said swellable additive capable of swelling in the presence of water is selected from the group of acrylic and methacrylic polymers, polyacrylamide copolymer, ethylene maleic anhydride copolymer, cross-linked carboxymethylcellulose, polyvinyl alcohol copolymers, cross-linked polyethylene oxide, and starch grafted copolymer of polyacrylonitrile.

10. The curable sealant composition of claim 1, wherein said swellable additive capable of swelling salt water is selected from the group of cellulose and atapulgite clay, or a mixture thereof.

11. The curable sealant composition of claim 1, wherein said free radical initiator is azo compounds, alkyl or acyl peroxides or hydroperoxides, ketoperoxides, peroxy esters, peroxy carbonates, peroxy ketals, or mixtures thereof.

* * * * *